United States Patent
Akazawa (10) Patent No.: US 11,057,537 B2
(45) Date of Patent: Jul. 6, 2021

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Minoru Akazawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/352,621

(22) Filed: Mar. 13, 2019

(65) Prior Publication Data

US 2019/0297216 A1 Sep. 26, 2019

(30) Foreign Application Priority Data

Mar. 22, 2018 (JP) .............................. JP2018-055103

(51) Int. Cl.
| | |
|---|---|
| *G06F 3/16* | (2006.01) |
| *H04N 1/32* | (2006.01) |
| *G06F 3/0481* | (2013.01) |
| *H04M 1/60* | (2006.01) |

(52) U.S. Cl.
CPC ....... *H04N 1/32037* (2013.01); *G06F 3/0481* (2013.01); *G06F 3/165* (2013.01); *H04M 1/6016* (2013.01)

(58) Field of Classification Search
None
See application file for complete search history.

(56) References Cited

U.S. PATENT DOCUMENTS

| | | | |
|---|---|---|---|
| 6,427,004 B1 * | 7/2002 | Minamizawa ........ | H04M 1/247 379/100.01 |
| 7,649,643 B2 * | 1/2010 | Salgado ............. | H04N 1/00413 358/1.15 |
| 9,454,251 B1 * | 9/2016 | Guihot ................... | G08C 17/02 |
| 2003/0053144 A1 * | 3/2003 | Itoh ........................ | H04M 1/578 358/441 |
| 2009/0027721 A1 * | 1/2009 | Misumi .............. | H04N 1/00416 358/1.15 |
| 2009/0153885 A1 * | 6/2009 | Yamaguchi ........ | H04N 1/00488 358/1.5 |
| 2014/0092417 A1 * | 4/2014 | Kuroishi ............ | H04N 1/00342 358/1.14 |
| 2019/0166263 A1 * | 5/2019 | Furusawa .......... | H04N 1/00488 |

FOREIGN PATENT DOCUMENTS

| | | | |
|---|---|---|---|
| CN | 101282111 A | * | 10/2008 |
| JP | 2000-022877 | | 1/2000 |

OTHER PUBLICATIONS

Foreign priority document for US 20190166263 A1 (Year: 2017).*
Rolston, Joanna. "Adjust Volume On Surface Tablet." lovemysurface, Mar. 1, 2016, www.lovemysurface.net/adjust-volume-on-surface-tablet/. (Year: 2016).*

* cited by examiner

*Primary Examiner* — James K Mooney (74) *Attorney, Agent, or Firm* — Venable LLP (57) ABSTRACT

The present image forming apparatus, in response to reception of facsimile data, outputs a monitoring sound at a predetermined sound volume, and displays a setting input screen for adjusting the sound volume on a display unit.

16 Claims, 11 Drawing Sheets

SETTING INPUT SCREEN FOR MONITORING SOUND VOLUME

FIG. 4

SCREEN TRANSITION PERMISSION INPUT SCREEN

AUTHENTICATION WAITING SCREEN — 401c

PLEASE TOUCH IC CARD TO CARD READER UNTIL A BEEP SOUNDS.
PLEASE ALWAYS LOGOUT AFTER ENDING OPERATION.

× CANCEL    LOGIN BY KEYBOARD>

⬇

MAIN MENU SCREEN — 401d

⌂ MAIN MENU
SELECT TARGET FUNCTION.

| COPY | FAX | SCAN AND TRANSMISSION | SAVE SCAN |
|---|---|---|---|
| USE SAVE FILE | INBOX | PRINT | INTRODUCE CONVENIENT FUNCTIONS |

FIG. 12

AUTHENTICATION WAITING SCREEN 401c

PLEASE TOUCH IC CARD TO CARD READER UNTIL A BEEP SOUNDS.
PLEASE ALWAYS LOGOUT AFTER ENDING OPERATION.

× CANCEL          LOGIN BY KEYBOARD>

⬇

SETTING INPUT SCREEN FOR MONITORING SOUND VOLUME 401a

<FAX MACHINE SOUND VOLUME ADJUSTMENT>

■ COMMUNICATION SOUND VOLUME

MUTE

× CANCEL          OK

FIG. 13

AUTHENTICATION WAITING SCREEN    401c

PLEASE TOUCH IC CARD TO CARD READER UNTIL A BEEP SOUNDS.
PLEASE ALWAYS LOGOUT AFTER ENDING OPERATION.

[× CANCEL]    [LOGIN BY KEYBOARD>]

SCREEN TRANSITION
PERMISSION INPUT SCREEN    401b

PLEASE TOUCH IC CARD TO CARD READER UNTIL BEEP SOUNDS.
PLEASE

■ DISPLAY FAX SOUND VOLUME ADJUSTMENT SCREEN?

[× CANCEL]    [OK]

[× CANCEL]    [LOGIN BY KEYBOARD>]

FIG. 14

IMAGE FORMING APPARATUS, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

Conventionally, an image forming apparatus provided with a facsimile function is typically provided with a speaker to enable the state of a line to be monitored. Thereby, a user can listen to a monitoring sound to thereby confirm that there is a facsimile reception, a key input sound when the image forming apparatus is operated, a response from a counterparty when the image forming apparatus is used as a telephone terminal, or the like. In addition, with a facsimile email service, it is possible to operate the image forming apparatus while listening, by the monitoring sound, to an explanation of an operation procedure from a counterparty. Because description of the operation procedure proceeds without regard to circumstances, when the sound volume is low and the sound is hard to hear, it is necessary to swiftly perform an operation to change a sound volume setting.

In relation to this, Japanese Patent Laid-Open No. 2000-22877 discloses a technique for performing an automatically display. According to Japanese Patent Laid-Open No. 2000-22877, if an on-hook key is pressed when the facsimile email service is being used for example, a sound volume key is displayed on an operation unit, and thus it is possible to immediately increase the sound volume when the sound volume is low.

However, there is a problem as is recited below in the foregoing conventional technique. For example, when a facsimile is received, normally it is typical for there to be automatic reception that does not require the press of an on-hook key or the like. Accordingly, with the conventional technique described above, it is not possible to comply with a desire to immediately make a setting for line monitoring sound volume when a facsimile is received, for example. Consequently, normally it is easy to perform a setting to increase the monitoring sound volume for confirming reception, but there is a problem in that it is not possible to support immediately suppressing the sound volume if a facsimile is received when a visitor has come for example.

SUMMARY OF THE INVENTION

The present invention enables realization of a mechanism for immediately changing sound volume for monitoring sound such as when a facsimile is received.

One aspect of the present invention provides an image forming apparatus, comprising: a reception unit that receives facsimile data; an audio output unit that, in response to reception of the facsimile data by the reception unit, outputs a monitoring sound at a predetermined sound volume; and a control unit that, in response to the reception of the facsimile data by the reception unit, displays on a display unit a setting input screen for adjusting the sound volume.

Another aspect of the present invention provides a method of controlling an image forming apparatus, the method comprising: receiving facsimile data; in response to reception of the facsimile data, outputting a monitoring sound at a predetermined sound volume; and in response to the reception of the facsimile data, displaying on a display unit a setting input screen for adjusting the sound volume.

Still another aspect of the present invention provides a non-transitory computer-readable storage medium storing a computer program for causing a computer to execute each step of a method of controlling an apparatus, the method comprising: receiving facsimile data; in response to reception of the facsimile data, outputting a monitoring sound at a predetermined sound volume; and in response to the reception of the facsimile data, displaying on a display unit a setting input screen for adjusting the sound volume.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Below, description will be given for a first embodiment of the present invention. Firstly, with reference to FIG. 1, description is given for a multi function peripheral 1000 which illustrates an example of an image forming apparatus of the present invention. In the present embodiment, description is given for a multi function peripheral which is an example of an image forming apparatus. However, there is no intention to limit the present invention, and the present invention can be applied in the case of an image forming apparatus that has a facsimile function.

Figure 1:
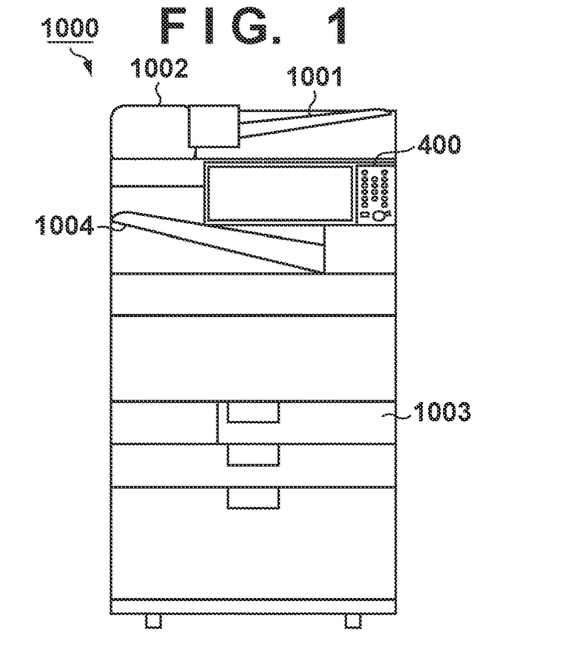
FIG. 1 illustrates a configuration of a multi function peripheral 1000 according to an embodiment.

The multi function peripheral 1000 is provided with an operation unit 400, a reading tray 1001, an automatic document feeder (ADF) 1002, a sheet cassette 1003, and a sheet discharge tray 1004. In addition, the multi function peripheral 1000 is provided with at least a scan function, a copy function, a print function, and a facsimile function. The scan function is a function for reading an original that has been set, and converting it into electronic data. The copy function is a function for printing data read by the scan function onto a sheet. The print function is a function for printing data, which has been received from a terminal connected via a network, to a sheet. The facsimile function is a function that enables image data to be transmitted or received between terminals that are connected via a public line.

For a facsimile transmission, firstly an original on which an image that is desired to be transmitted has been drawn is set on the reading tray 1001, and then an operation to start transmission is performed at the operation unit 400, with a facsimile number of a transmission destination designated. Subsequently, the ADF 1002 starts reading while pulling the original, converts read electronic data to a facsimile communication data format, and performs a data transmission to a transmission destination terminal via the public line. In contrast, for facsimile reception, facsimile data is received from a transmission source terminal via the public line, printing based on received data is performed while pulling a sheet stacked in the sheet cassette 1003, and the sheet on which the printing based on the received data is discharged to the sheet discharge tray 1004.

At a time of either facsimile transmission/reception, the exchange of electrical signals following a facsimile communication protocol between the terminals is performed via the public line. At this point, a speaker 700 which will be described later and is incorporated in the multi function peripheral 1000 performs audio output with the electrical signal for the line as a monitoring sound for a facsimile communication. A user of the multi function peripheral 1000 can recognize that facsimile transmission/reception is being performed by checking this monitoring sound.

<Configuration of Multi Function Peripheral>

Figure 2:
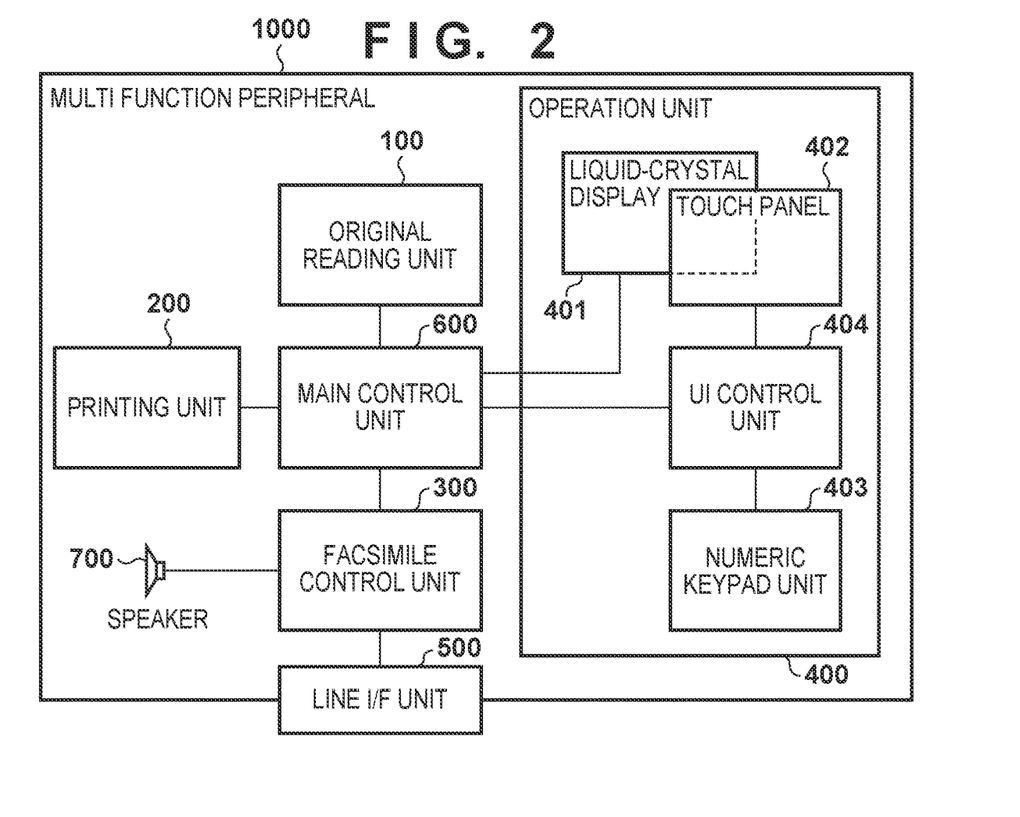
FIG. 2 is a block diagram of the multi function peripheral 1000 according to an embodiment.

Next, with reference to FIG. 2, description is given regarding an example of a configuration of the multi function peripheral 1000 according to the present embodiment. The multi function peripheral 1000 is provided with an original reading unit 100, a printing unit 200, a facsimile control unit 300, the operation unit 400, a line I/F unit 500, the main control unit 600, and the speaker 700.

The original reading unit 100, by an image capturing element such as a CMOS or CCD sensor (not shown), reads, as RGB data for example, an original that has been stacked on the reading tray 1001 and pulled by the ADF 1002, for example, converts it to digital image data, and transfers the digital image data to the main control unit 600. By a electrophotographic mechanism (not shown) and in accordance with digital image data transferred from the main control unit 600, the printing unit 200, with respect to a sheet pulled from the sheet cassette 1003, performs laser irradiation, transfers toner, causes the toner to be fixed, and then outputs the sheet to the sheet discharge tray 1004.

The facsimile control unit 300 performs facsimile communication with an external terminal via the public line which is connected in advance to the line I/F unit 500 which is configured by a plug-in phone jack, for example. At a time of a facsimile transmission, firstly a call is made to a transmission destination instructed from the main control unit 600, and it is confirmed that transmission to the transmission destination can be made. Next, compressed image data transferred from the main control unit 600 is converted to analog, and transmitted to the transmission destination in accordance with a facsimile protocol. At a time of a facsimile reception, after first receiving an incoming signal from the transmission source via the public line, the facsimile control unit 300 makes a response indicating that reception is possible. Next, the facsimile control unit 300 receives image data in accordance with a facsimile protocol, digitalizes the image data, and then transfers the image data to the main control unit 600.

In addition, the facsimile control unit 300 monitors an electrical signal of the line for performing facsimile communication, and can produce sound by the speaker 700 after amplifying the electrical signal. Sound volume of the speaker 700 can be set by adjusting a gain of the electrical signal in accordance with an instruction from the main control unit 600.

The operation unit 400 is provided with a liquid-crystal display 401, a touch panel 402, a numeric keypad unit 403, and a UI control unit 404. The liquid-crystal display 401 displays display image data transferred from the main control unit 600 on a screen. The touch panel 402 is provided so as to be superimposed on the screen of the liquid-crystal display 401, and detects a physical quantity where a touch position can be discriminated. The numeric keypad unit 403 includes an LED and a numeric keypad configured by switches or the like. The numeric keypad unit 403 conveys a key press to the UI control unit 404 and also causes the LED to light in accordance with a lighting instruction by the UI control unit 404.

The UI control unit 404 is configured by a microcomputer or the like, and conveys, to the main control unit 600, content inputted via the touch panel 402 or the numeric keypad unit 403 with respect to various input screens displayed by the liquid-crystal display 401. Specifically, for a touch input with respect to the touch panel 402, a touch position is detected by x and y coordinates. In addition, for a key input with respect to the numeric keypad unit 403, a key pressed from the plurality thereof is detected, and conveys this to the main control unit 600.

The main control unit 600 is provided with a CPU, a RAM, and a ROM (not shown), and comprehensively controls the multi function peripheral 1000. In particular, the main control unit 600 performs necessary image processing or compression/decompression processing on digital image data transferred from the original reading unit 100 or transferred from the facsimile control unit 300 after being subject to a facsimile reception. In addition, processing for transferring the image data processing in this way to the printing unit 200 and outputting a print instruction, or transferring the image data to the facsimile control unit 300 and outputting an instruction for a facsimile transmission is executed. All of this processing is triggered by an input from the operation unit 400 or a facsimile reception from the facsimile control unit 300.

The main control unit 600 holds display image data that the liquid-crystal display 401 is to be caused to display, and, in accordance with circumstances, can transfer the display image data to the liquid-crystal display 401 and cause it to display the display image data. Furthermore, the main control unit 600 holds various settings of the multi function peripheral 1000, and, as an example in relation to the present embodiment, holds a setting value for a monitoring sound volume of a facsimile. The main control unit 600 accepts a new setting input from the operation unit 400 by way of a user input, outputs an instruction for a sound volume setting to the facsimile control unit 300, and holds the new setting as a current monitoring sound volume setting value.

<Setting Input Screen>

Figure 3:
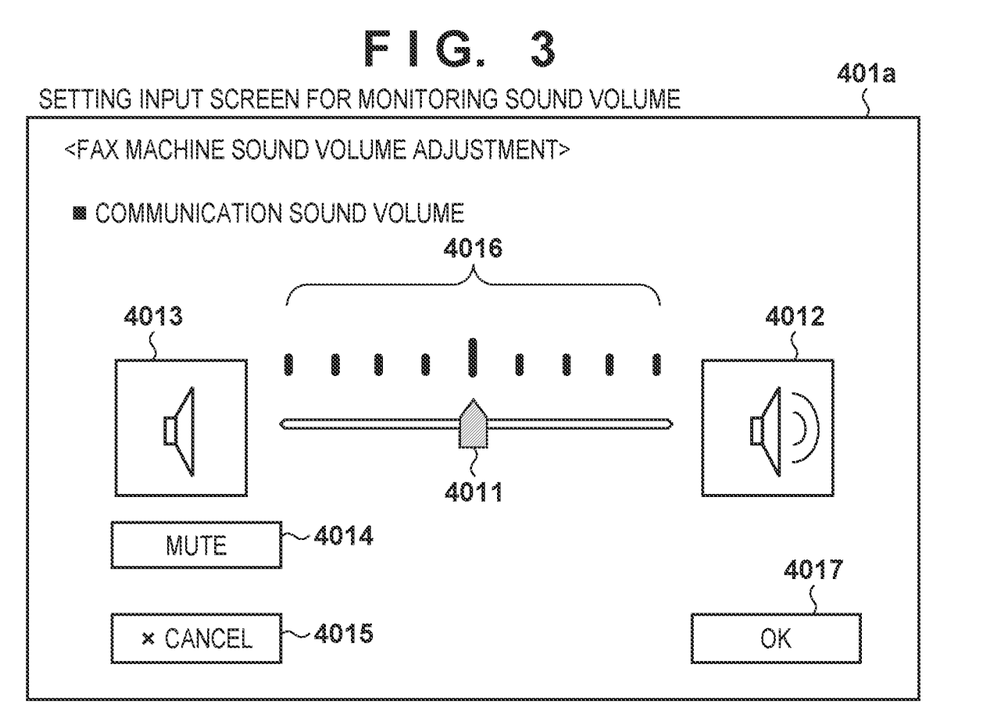
FIG. 3 illustrates a monitoring sound volume setting input screen 401a according to an embodiment.

Next, with reference to FIG. 3, description is given for the facsimile communication monitoring sound volume setting input screen 401*a* that is displayed on the liquid-crystal display 401, according to the present embodiment. The setting input screen 401*a* is configured by including a sound volume scale 4016, a slider 4011, an increase sound volume key 4012, a decrease sound volume key 4013, a mute key 4014, a cancel key 4015, and an OK key 4017.

As indicated by the sound volume scale 4016, the sound volume can be set at a first to a ninth step, and the slider 4011 illustrated in FIG. 3 indicates the fifth step of the scale. Accordingly, letting the maximum sound volume be the level at the ninth step, the current sound volume is at a level for the fifth step. In addition, by pressing the increase sound volume key 4012 or the decrease sound volume key 4013, the slider 4011 can be moved by one step at a time.

By pressing the OK key 4017, a setting is held by the main control unit 600, and the set sound volume is realized. In addition, by pressing the mute key 4014, the slider 4011 can be caused to move to the first step which is leftmost in the sound volume scale 4016, which stops the monitoring sound. If there is a desire to cancel the setting operation, the cancel key 4015 may be pressed. By such operations it is possible to set the magnitude of the monitoring sound volume.

To have the monitoring sound volume setting input screen 401*a* described above be displayed, typically a dedicated key for transitioning to this screen is provided on the numeric keypad unit 403. Alternatively, this screen may be displayed by a touch operation on the touch panel 402, with respect to a key for performing a screen transition that is displayed on the liquid-crystal display 401.

<Facsimile Operation>

Description is given here regarding a facsimile operation according to the present embodiment. If there is a notification of a facsimile reception from the facsimile control unit 300 and the monitoring sound volume setting value held in the main control unit 600 is set to be greater than or equal to a predetermined value, the main control unit 600 automatically causes the liquid-crystal display 401 to display the monitoring sound volume setting input screen 401*a*. Note that, while description is given for control for automatically displaying the setting input screen 401*a* by whether a sound volume setting value for monitoring sound is greater than or equal to the predetermined value, there is no intention to limit the present invention. For example, the setting input screen 401*a* may be always displayed if there is a notification of the facsimile reception, and other conditions may be added. For example, the screen may be displayed if the current time is during a predesignated time period in which a visitor or the like is expected.

By causing a screen that enables a user to set a monitoring sound volume to be automatically displayed in a case where the monitoring sound volume is high when a facsimile is received, it becomes possible to immediately perform a setting for suppressing the sound volume. This is useful for a situation where there is a desire to normally have a sound volume setting to enable the sound for when a facsimile is received be adequately confirmed, and also a desire to quickly suppress the sound volume.

Figure 4:
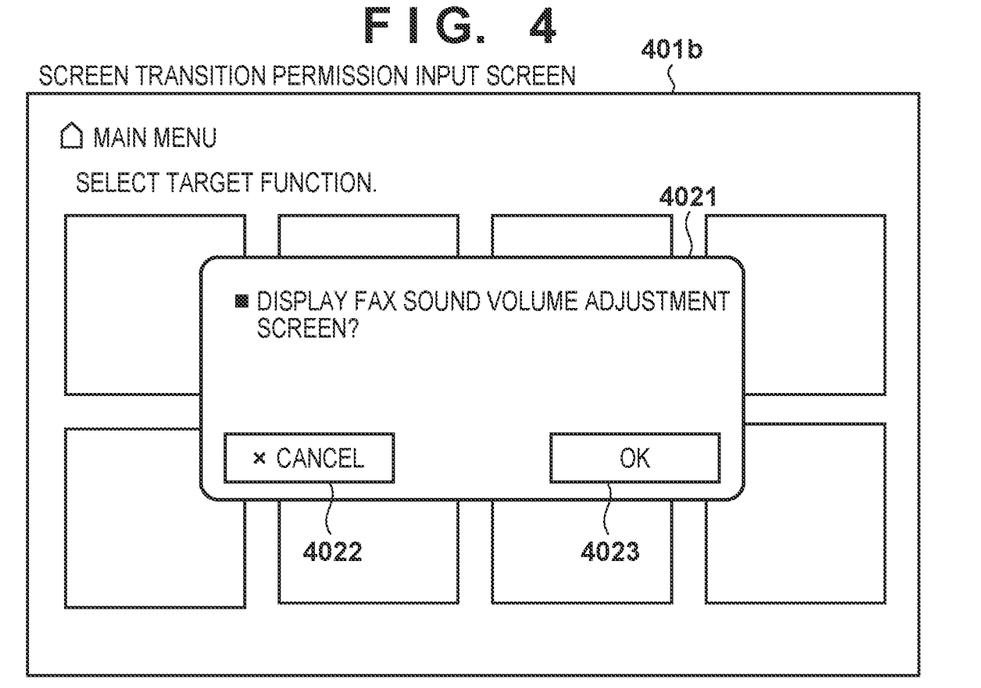
FIG. 4 illustrates a permission input screen 401b for a screen transition, according to an embodiment.

In addition, cases where change of the monitoring sound volume is unnecessary may also be considered. In such a case, if there is an automatic screen transition after a facsimile reception while a user is operating the operation unit 400, the user who is operating the operation unit 400 may find this undesirable. Accordingly, as illustrated by FIG. 4, configuration may be taken to display a screen transition permission input screen (a pop-up screen) 401*b*, and let a user select whether to transition to the screen. The permission input screen 401*b* includes a message 4021 for asking whether to display the setting input screen 401*a* for adjusting fax sound volume (the monitoring sound volume), a cancel button 4022 for canceling transition to this screen, and an OK button 4023 for permitting transition to this screen. When the OK button 4023 is pressed, the main control unit 600 causes the display to transition to the setting input screen 401*a*.

<Processing Procedure>

Figure 5:
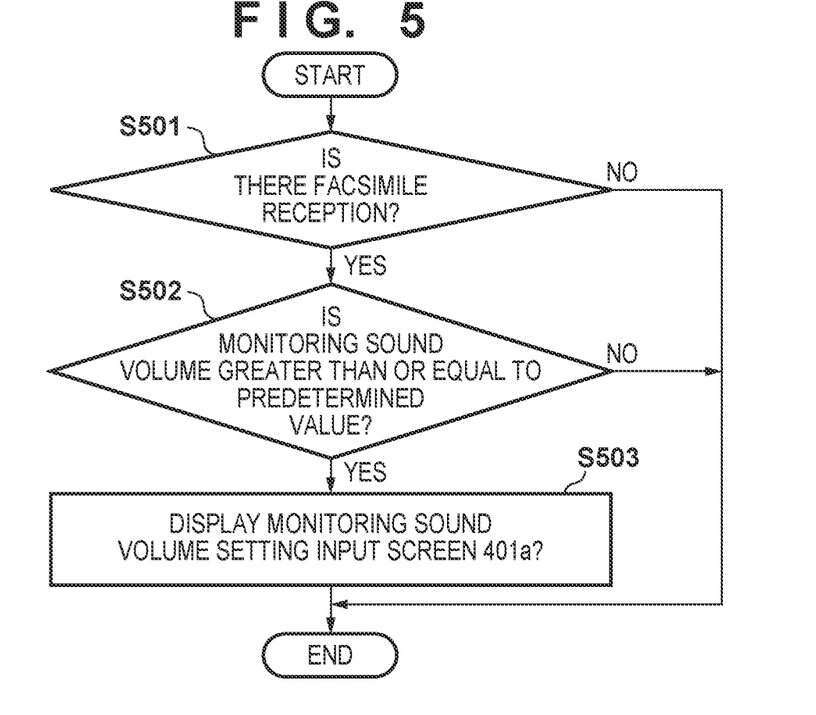
FIG. 5 is an operation flowchart of a main control unit 600 according to an embodiment.

Next, with reference to FIG. 5, description is given regarding a processing procedure of the main control unit 600 according to the present embodiment. Processing described below is realized by the CPU of the main control unit 600 reading a control program stored in advance in the ROM into the RAM, and then executing it, for example.

In step S501, the main control unit 600 is confirms whether or not there is a facsimile reception in the facsimile control unit 300. If there is no facsimile reception, the processing ends. However, if there is a facsimile reception, the processing proceeds to step S502, and the main control unit 600 confirms the sound volume setting value for the monitoring sound which is held in advance, and determines whether it is greater than or equal to a predetermined value. If it is less than the predetermined value, the processing ends.

The predetermined value here is one of the nine steps of the sound volume scale 4016 illustrated in FIG. 3. Typically, the first step of the sound volume scale 4016 which is a mute state or a low sound volume setting value of the second step is envisioned. This value may be a fixed value that is defined in advance, or configuration may be taken to allow a user to set this value via the operation unit 400, and cause the main control unit 600 to hold the setting value.

If the monitoring sound volume is greater than or equal to the predetermined value in step S502, the main control unit 600, in step S503, causes the liquid-crystal display 401 to display the monitoring sound volume setting input screen 401*a* illustrated in FIG. 3. Note that the screen displayed here may be the screen transition permission input screen 401*b* that is illustrated by FIG. 4. In this case, the setting input screen 401*a* is displayed when the OK button 4023 is pressed.

As described above, a user can adjust the sound volume of the monitoring sound via the setting input screen 401*a*. The sound volume set here may be applied to only a current facsimile reception, or the adjusted sound volume may be continuously applied for all subsequent facsimile receptions. When applied only to a current facsimile reception, when the current facsimile reception ends, the main control unit 600 performs control to return to the sound volume that was set in advance. In contrast, when the adjusted sound volume is continuously applied for all subsequent facsimile receptions, the main control unit 600 performs control to update the sound volume setting value that was stored in advance, by the adjusted sound volume. Consequently, the setting input screen 401a may include a display for setting whether to handle an adjusted sound volume by one of the ways described above.

As described above, the image forming apparatus according to the present embodiment, in response to reception of facsimile data, outputs monitoring sound at a predetermined sound volume, and displays a setting input screen for adjusting the sound volume on a display unit. In addition, if the predetermined sound volume is greater than or equal to a predetermined value, the image forming apparatus may display the setting input screen on the display unit. In this way, by virtue of the present embodiment, it is possible to automatically display a screen for changing the monitoring sound for when a facsimile is received, in response to reception of a facsimile. Accordingly, a user can immediately adjust the sound volume as necessary, and can make a setting for outputting monitoring sound in normal times with peace of mind. Note that, in the present embodiment, description was given with control for when a facsimile is received, but similar control may be performed when a facsimile is transmitted.

Second Embodiment

Below, description will be given for a second embodiment of the present invention. In the first embodiment described above, description was given regarding a configuration for controlling whether to automatically display a setting input screen or the like in accordance with a monitoring sound sound volume setting value, when a facsimile is received. In the present embodiment, an image forming apparatus is provided with a human detection sensor, and description is given regarding a configuration for controlling whether to automatically display a setting input screen or the like upon a return from a power saving state in accordance with an output by the human detection sensor.

Figure 6:
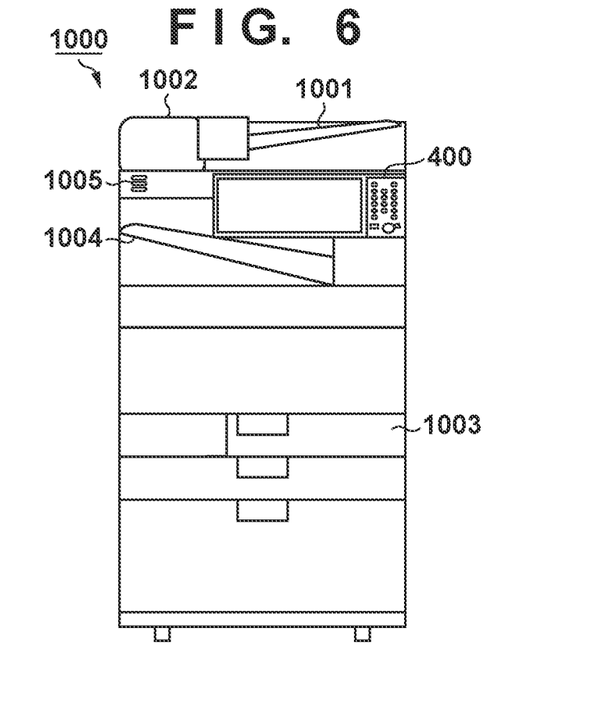
FIG. 6 illustrates a configuration of the multi function peripheral 1000 according to an embodiment.
Figure 7:
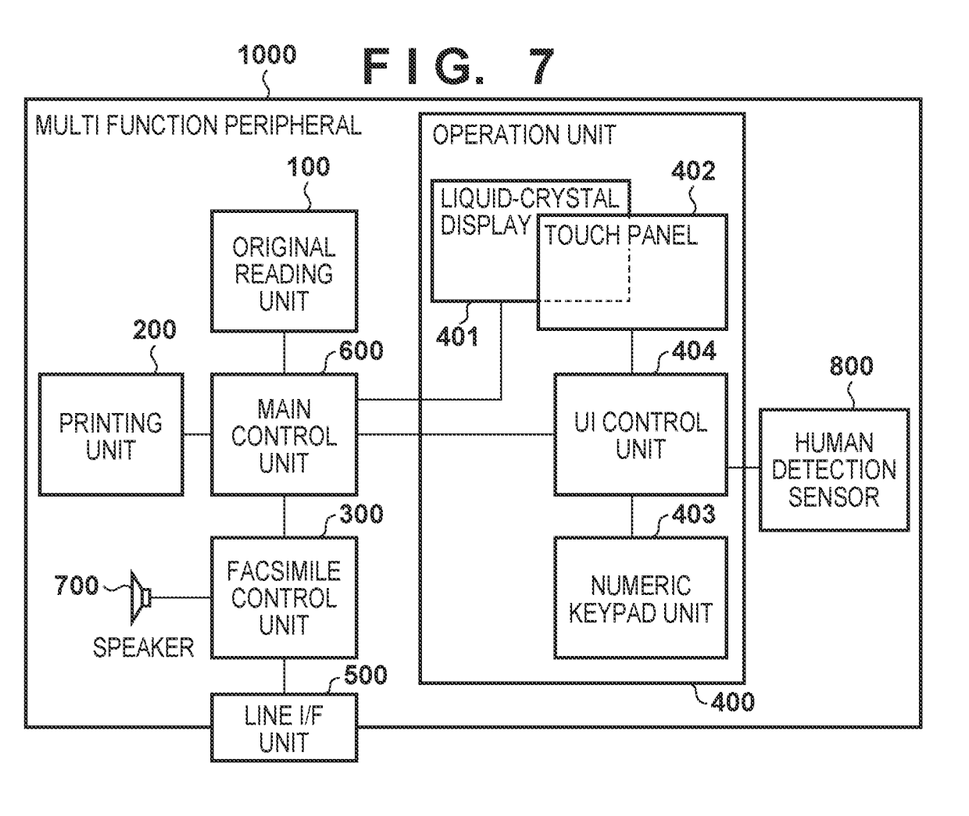
FIG. 7 is a block diagram of the multi function peripheral 1000 according to an embodiment.

Firstly, with reference to FIG. 6, description is given regarding an example of the multi function peripheral 1000 according to the present embodiment. In addition to the configuration of the multi function peripheral 1000 in the foregoing first embodiment described by FIG. 1, the multi function peripheral 1000 according to the present embodiment is provided with slits 1005 on an exterior covering. A human detection sensor 800 described later by FIG. 7 is incorporated behind the slits 1005, and can detect an approach of a human through the slits 1005. Further configuration is similar to the configuration described using FIG. 1 in the foregoing first embodiment, and therefore description thereof is omitted.

<Configuration of Multi Function Peripheral>

Next, with reference to FIG. 7, description is given regarding an example of a configuration of the multi function peripheral 1000 according to the present embodiment. The multi function peripheral 1000 according to the present embodiment is provided with the human detection sensor 800 in addition to the configuration described in the foregoing first embodiment. Description below is mainly for differences with the foregoing first embodiment. The human detection sensor 800 has a certain detection range, and an ultrasonic sensor, a pyroelectric sensor, an infrared array sensor, or the like may be used for the human detection sensor 800. The UI control unit 404 detects whether there is an object (a human) in the detection range of the human detection sensor 800 based on an output of the human detection sensor. Furthermore, the UI control unit 404 detects a distance to the object, and can detect whether the detected object is a human in accordance with change of the distance, and if the object is a detected as a human, detect whether the detected human is approaching the multi function peripheral 1000. This control may be performed by the main control unit 600 based on an output of the human detection sensor 800 that is notified via the UI control unit 404. Note that, because control for detection of the approach of a human is not the subject of the present invention, detailed description thereof is omitted.

If an unused state of the multi function peripheral 1000 continues for a certain amount of time or if a power saving key included in the numeric keypad unit 403 is pressed, the main control unit 600 can stop power supply to specific locations, and fall into a power saving state. For example, it is possible to reduce power consumption when the multi function peripheral 1000 is not in use by stopping power supply to the original reading unit 100, the printing unit 200, or the liquid-crystal display 401 of the operation unit 400.

In such a power saving state, the UI control unit 404 can detect the approach of a human via the human detection sensor 800. At such a time, upon detecting the approach of a human, the UI control unit 404 conveys that to the main control unit 600. Receiving this signal, the main control unit 600 performs control to supply power to the locations for which power supply was stopped, and performs an operation for returning from the power saving state to a standby state. When a user approaches the multi function peripheral 1000 whose liquid-crystal display 401 is truly dark, a main screen is automatically displayed on the liquid-crystal display 401, and they can smoothly start operation of the operation unit 400 without needing to perform an operation for returning from the power saving state to standby manually.

<Facsimile Operation>

Description is given here regarding an operation for facsimile reception in the power saving state described above. In the multi function peripheral 1000 that has the human detection sensor 800, facsimile reception is possible even in the power saving state. Upon receiving a facsimile, the facsimile control unit 300 conveys it to the main control unit 600. Receiving this, the main control unit 600 performs control so as to supply power to only the printing unit 200, and performs printing by passing image data to the printing unit 200. During this control, by virtue of the present embodiment, control for whether to automatically display the setting input screen or the like described by the foregoing first embodiment is performed.

Normally, upon receiving notification of a facsimile reception from the facsimile control unit 300 while in the power saving state described above, the main control unit 600 performs control so as to supply power to only the printing unit 200, and then attempts to print the received image data. Furthermore, the main control unit 600 causes the speaker 700 to output the line monitoring sound, similarly to when a facsimile is received at a time of standby.

Here, if the main control unit 600 has detected the approach of a human via the human detection sensor 800, the main control unit 600 performs an operation for returning from the power saving state to standing by. Furthermore, a facsimile is being received, the main control unit 600 causes the liquid-crystal display 401 to display the monitoring sound volume setting input screen 401a if the held monitoring sound volume setting value is set to be greater than or equal to the predetermined value.

It is envisioned that there is a user who approaches the multi function peripheral 1000 in order to operate it to lower the sound volume because the line monitoring sound is loud, when a facsimile is received in the power saving state. In response to such a case, in the present embodiment, the liquid-crystal display 401 is first caused to display the monitoring sound volume setting input screen 401a when there is a return from the power saving state to standing by. By doing this, a user can immediately make a setting for lowering the sound volume, and therefore convenience increases. In addition, cases where change of the monitoring sound volume is unnecessary may also be considered. In such a case, as described in the foregoing first embodiment, it is sufficient if the screen transition permission input screen 401b illustrated in FIG. 4 is displayed when there is a return from the power saving state to standing by. Note that, the language "when there is a return" includes the concepts of "during the return" and "after the return", and indicates a period from a timing when the main control unit 600 can start control for displaying to the liquid-crystal display 401.

<Processing Procedure>

Figure 8:
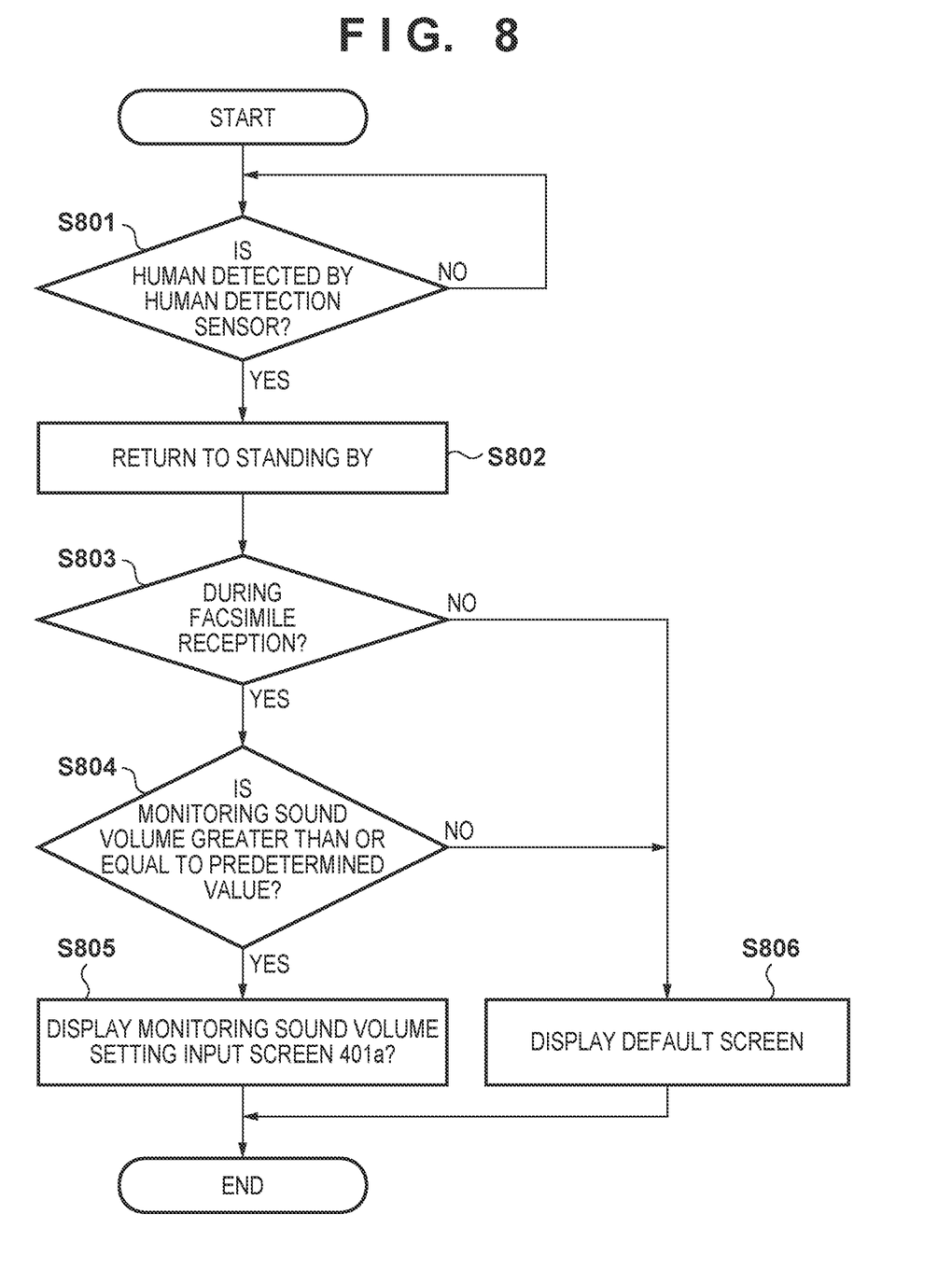
FIG. 8 is an operation flowchart of the main control unit 600 according to an embodiment.

With reference to FIG. 8, description is given below for a processing procedure of the main control unit 600 according to the present embodiment. Processing described below is realized by the CPU of the main control unit 600 reading a control program stored in advance in the ROM into the RAM, and then executing it, for example. The operation flowchart of FIG. 8 is limited to being executed when the multi function peripheral 1000 is in the power saving state.

In step S801, the main control unit 600 determines whether the approach of a human has been detected, via the human detection sensor 800 and the UI control unit 404. The multi function peripheral 1000 remains in the power saving state until there is an approach of a human. When the approach of the human is detected, the processing proceeds to step S802, and the main control unit 600 supplies power to predetermined locations of the multi function peripheral 1000 for which power supply was stopped, and executes processing for returning to the standby state.

Next, in step S803, upon returning from the power saving state in step S802, the main control unit 600 determines whether facsimile reception processing is being performed in the facsimile control unit 300. If facsimile reception processing is not being performed, the processing proceeds to step S806, and the main control unit 600 causes the liquid-crystal display 401 to display a default screen to be initially displayed upon returning from the power saving state to the standby state.

However, if facsimile reception processing is being executed, the processing proceeds to step S804, and the main control unit 600 confirms the sound volume setting value for the monitoring sound which is held in advance, and determines whether it is greater than or equal to a predetermined value. If less than the predetermined value, the processing proceeds to step S806, and the main control unit 600 causes the liquid-crystal display 401 to display a default screen to be initially displayed upon returning from the power saving state to the standby state. Because details regarding the predetermined value are similar to those described in the foregoing first embodiment, description thereof is omitted. However, if the setting value is greater than or equal to the predetermined value, the processing proceeds to step S805, and the main control unit 600 causes the liquid-crystal display 401 to display the monitoring sound volume setting input screen 401a. Similarly to in the foregoing first embodiment, the screen transition permission input screen 401b may be displayed.

As described above, the image forming apparatus according to the present embodiment is also provided with a human detection sensor in addition to the configuration of the foregoing first embodiment, and returns to the standby state upon detecting the approach of a human by the human detection sensor in the power saving state. Furthermore, when during reception of a facsimile at a time of the return, the image forming apparatus displays the setting input screen instead of a default screen. In this way, by virtue of the present embodiment, the setting input screen is automatically displayed when receiving facsimile data, even at a time of returning from the power saving state. Accordingly, a user can immediately adjust the sound volume as necessary, and can make a setting for outputting monitoring sound in normal times with peace of mind.

Third Embodiment

Below, explanation will be given for a third embodiment of the present invention. The present embodiment is similar to the configuration of the multi function peripheral 1000 of the foregoing second embodiment, but description is given for control in a case where a function for detecting the approach of a human by the human detection sensor 800 is set to off. In such a case, return from the power saving state to standing by is triggered by input from the operation unit 400. As an example, there is detection of a touch by the touch panel 402, or a press of a specific key of the numeric keypad unit 403. At a time of a return from the power saving state, similar control to that of the foregoing second embodiment is performed. Note that, in the present embodiment, although a case where the function for detecting the approach of a human is set to off is envisioned, application can also be made to a case where it is set to on. In other words, the present embodiment and the foregoing second embodiment can be applied in combination. In such a case, even in a case where the approach of a human cannot be detected by the human detection sensor 800 due to some kind of factor, it is possible to perform control for whether to display a setting input screen at a time of a return to the standby state in response to a user input.

<Processing Procedure>

Figure 9:
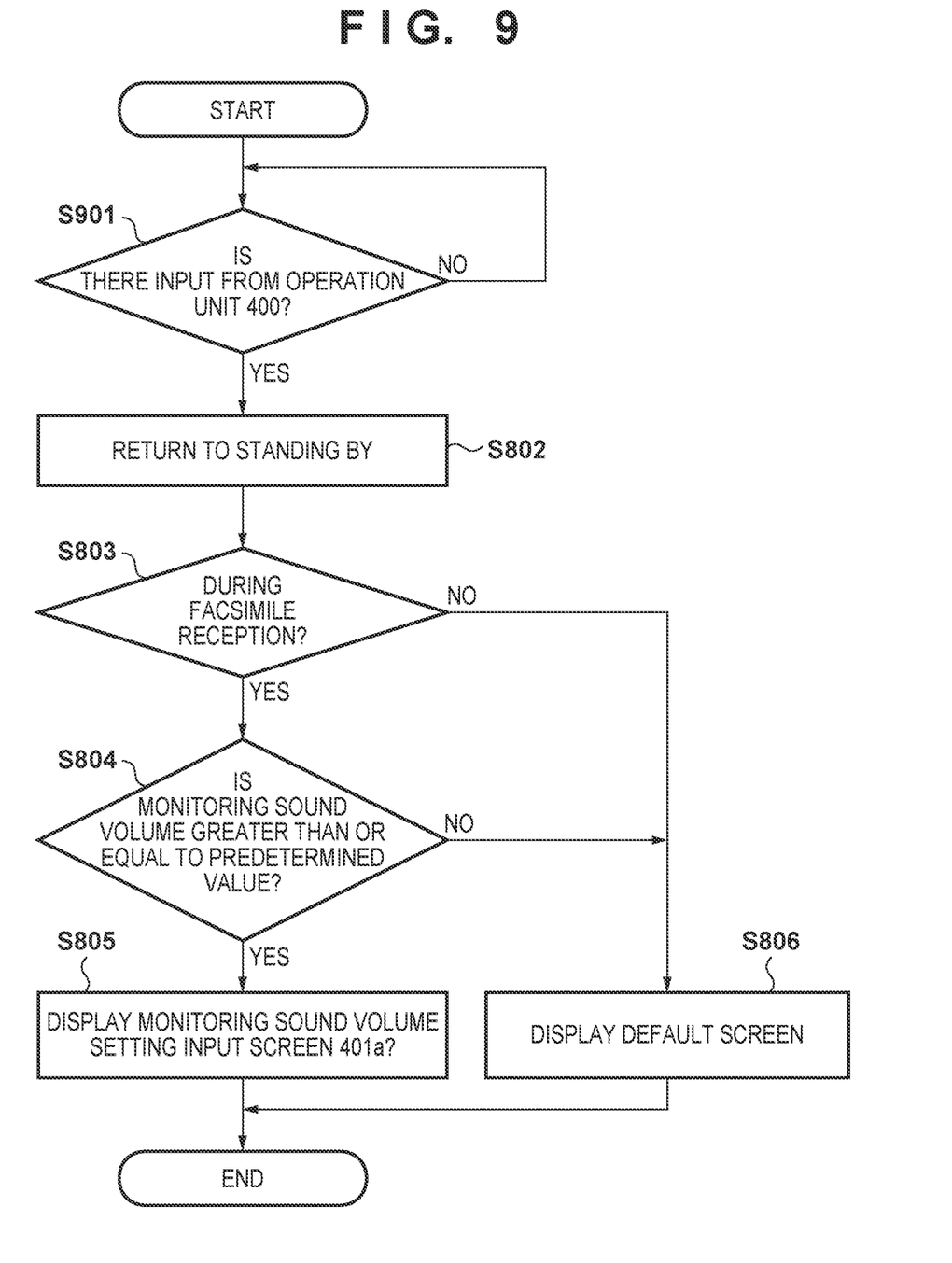
FIG. 9 is an operation flowchart of the main control unit 600 according to an embodiment.

Next, with reference to FIG. 9, description is given regarding a processing procedure of the main control unit 600 according to the present embodiment. Processing described below is realized by the CPU of the main control unit 600 reading a control program stored in advance in the ROM into the RAM, and then executing it, for example. The operation flowchart of FIG. 9 is executed when the multi function peripheral 1000 is in the power saving state and the function for detecting the approach of a human by the human detection sensor 800 is off.

In step S901, the main control unit 600 confirms whether there is input from the operation unit 400, via the UI control unit 404. Types of inputs may be, as described above, a touch of the touch panel 402, a press of a specific key of the numeric keypad unit 403, or the like. The multi function peripheral 1000 remains in the power saving state until there is input. In contrast, when input is detected, the processing advances to step S802, and processing similar to that of the foregoing second embodiment is executed.

As described above, upon accepting a user input via the operation unit in the power saving state, the image forming apparatus according to the present embodiment returns to the standby state. Furthermore, when during reception of a facsimile at a time of the return, the image forming apparatus displays the setting input screen instead of a default screen. In this way, by virtue of the present embodiment, the setting input screen is automatically displayed when receiving facsimile data, even at a time of returning from the power saving state. Accordingly, a user can immediately adjust the sound volume as necessary, and can make a setting for outputting the monitoring sound in normal times with peace of mind.

Fourth Embodiment

Below, explanation will be given for a fourth embodiment of the present invention. In the present embodiment, description is given for control in a case where a card reading unit for reading a card used to authenticate a user is provided in addition to the configuration of the foregoing second or third embodiment. Description regarding control and configuration similar to that in the foregoing embodiments is omitted.

<Configuration of Multi Function Peripheral>

Figure 10:
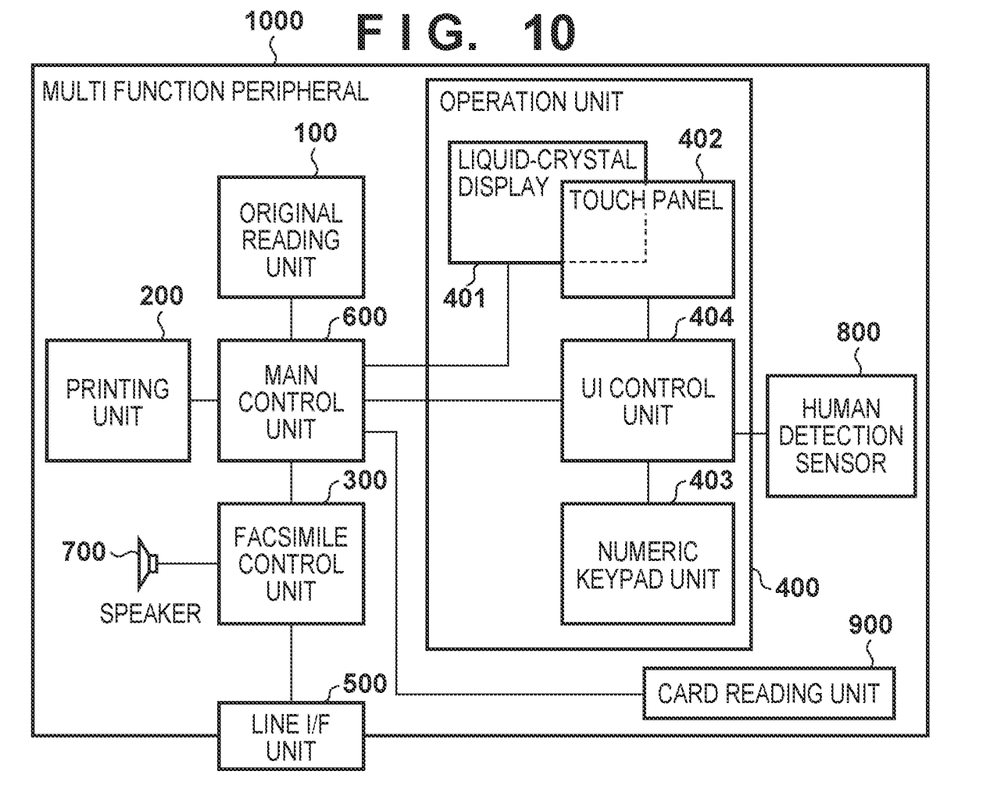
FIG. 10 is a block diagram of the multi function peripheral 1000 according to an embodiment.

Next, with reference to FIG. 10, description is given regarding an example of a configuration of the multi function peripheral 1000 according to the present embodiment. A difference with the multi function peripheral 1000 in the foregoing second or third embodiments is that a card reading unit 900 is connected to the main control unit 600. The card reading unit 900 may be configured to read a non-contact IC card, and may be configured to read a magnetic card that has been inserted. The card reading unit 900 conveys information read from the card to the main control unit 600. The multi function peripheral 1000 is provided with an authentication function by the main control unit 600, and stores in advance, for example, numbers as IDs for authenticating users who can use the multi function peripheral 1000. When an ID written to a tag incorporated in a user's card is read by the card reading unit 900 and matched with an ID stored in advance by the main control unit 600, usage of the multi function peripheral 1000 becomes possible.

<Screen Transition>

Figure 11:
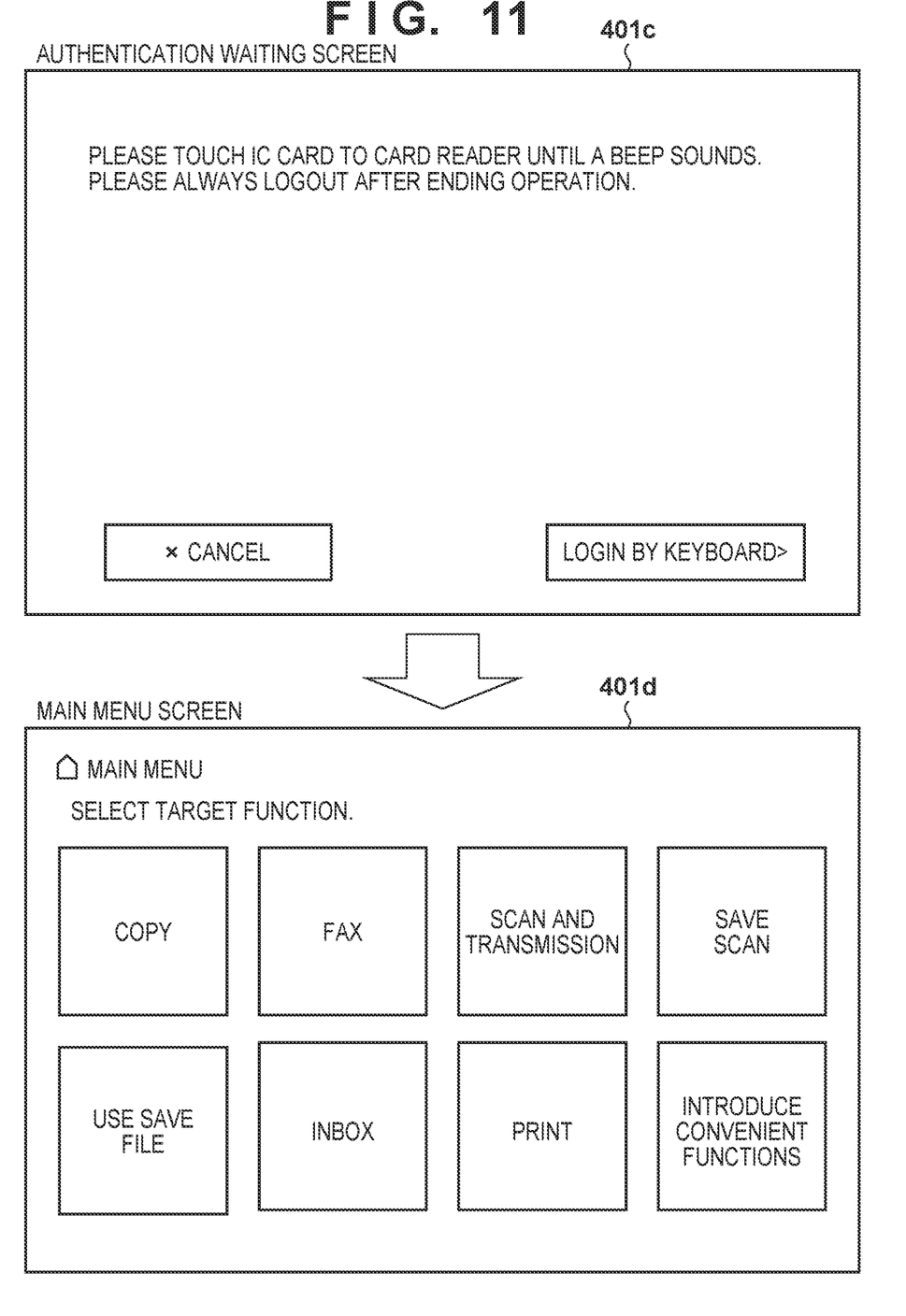
FIG. 11 illustrates an authentication waiting screen 401c and a main menu screen 401d.
Figure 12:
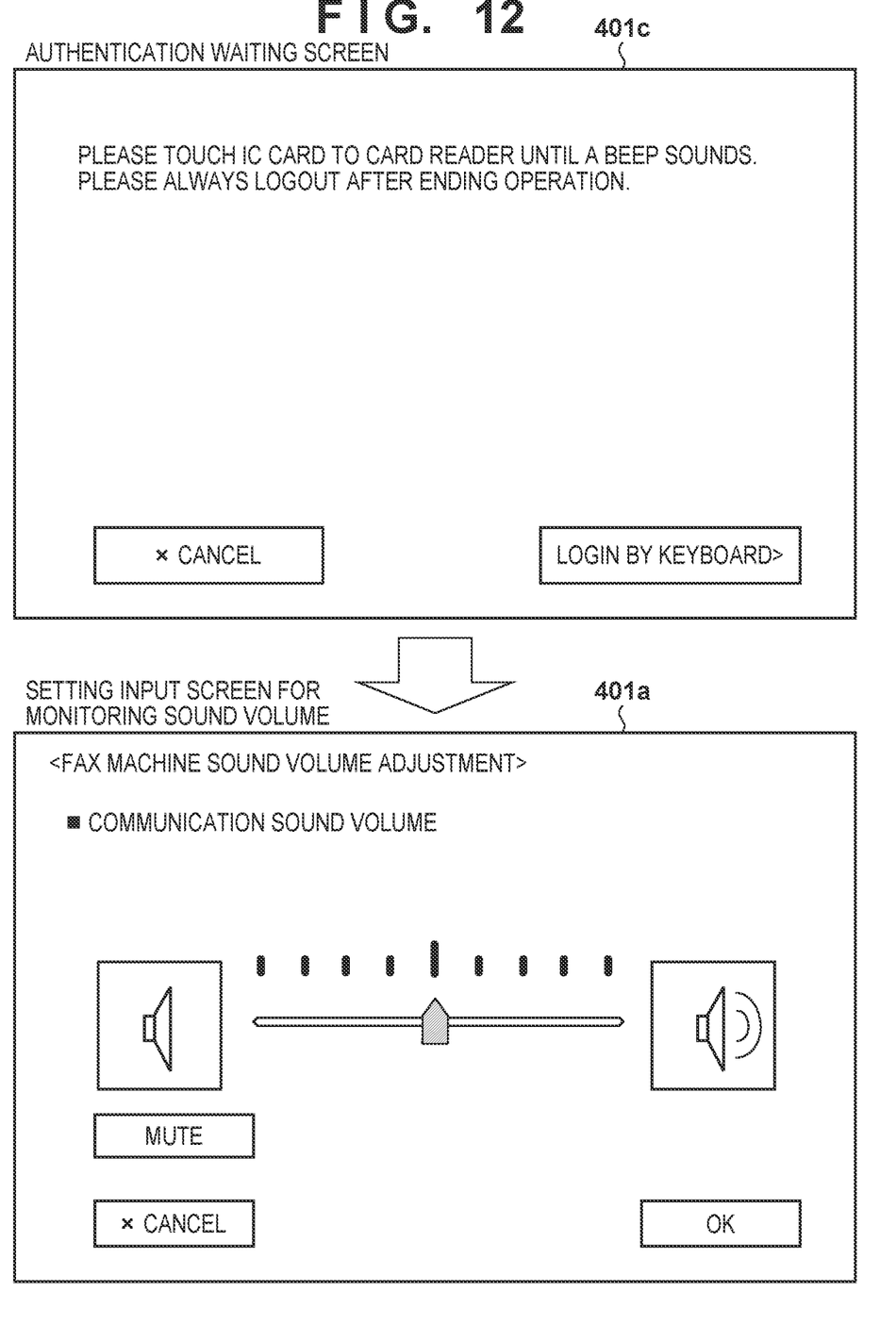
FIG. 12 illustrates the monitoring sound volume setting input screen 401a and the authentication waiting screen 401c according to an embodiment.
Figure 13:
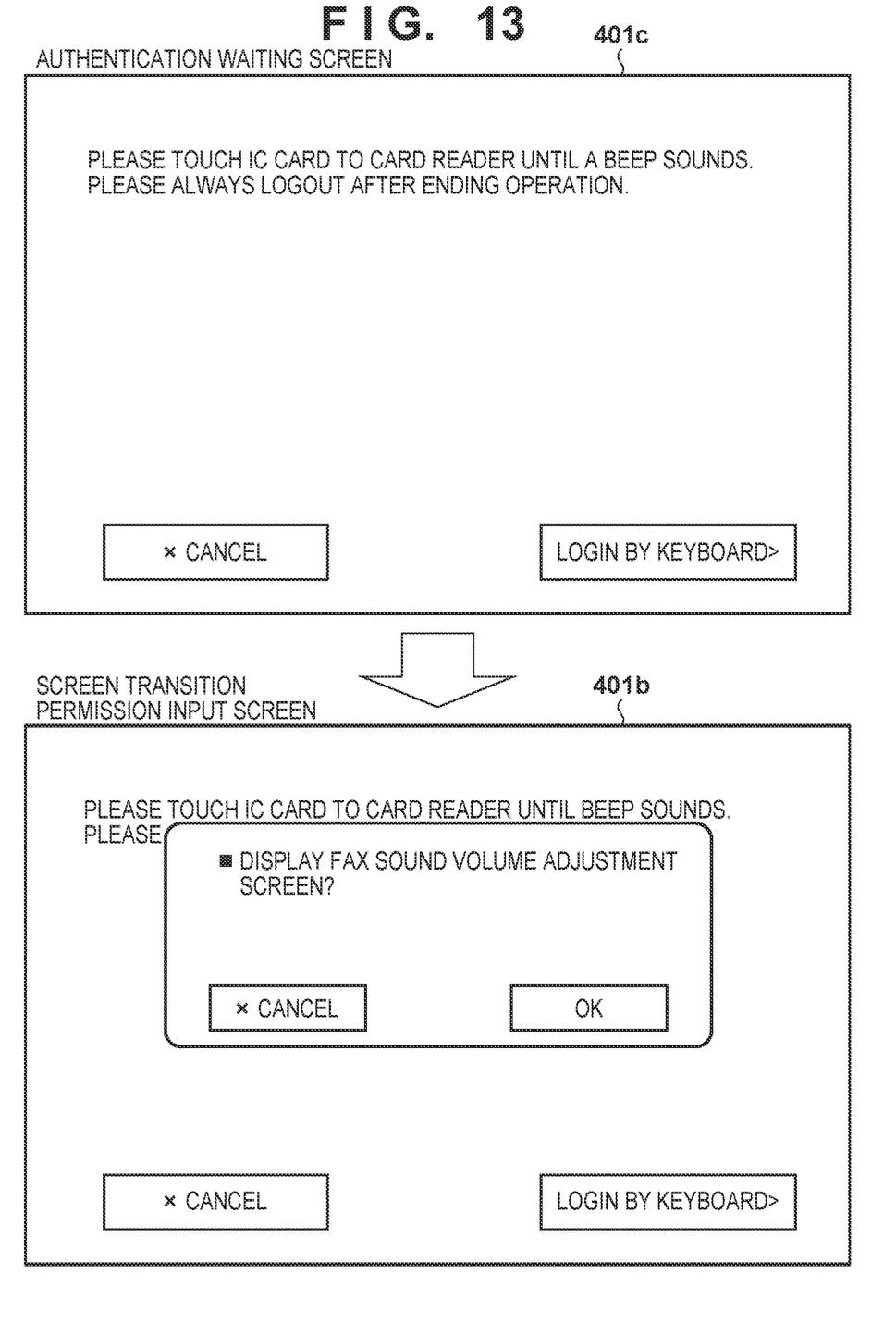
FIG. 13 illustrates the permission input screen 401b for a screen transition and the authentication waiting screen 401c according to an embodiment.

With reference to FIG. 11 through FIG. 13, description is given below regarding screen transitions according to the present embodiment. FIG. 11 illustrates a screen regarding authentication that is displayed by the liquid-crystal display 401.

In a state of the multi function peripheral 1000 where user authentication has not been completed, the liquid-crystal display 401 displays the authentication waiting screen 401c that is illustrated by FIG. 11. The authentication waiting screen 401c displays a message prompting that an IC card be touched to the non-contact card reader (the card reading unit 900), and selectably displays a cancel button and a button for switching to login by keyboard.

In accordance with the displayed language, a user touches a card to which their own ID has been written to the card reading unit 900. The card reading unit 900 conveys received card information to the main control unit 600. The main control unit 600 makes a comparison with information stored in advance to perform authentication. When authentication succeeds, as illustrated by FIG. 11, for example, the main control unit 600 causes the screen to transition to the main menu screen 401d, and enables usage of the multi function peripheral 1000 by a touch operation with respect to the touch panel 402. After authentication, a screen to display first may be the main menu screen 401d as in FIG. 11, or may be a default screen set by the user.

For a case where usage of the multi function peripheral 1000 is complete and the authentication waiting screen 401c is returned to, there is a logout operation in accordance with a touch of a logout key of the touch panel 402 or a press of a dedicated key of the numeric keypad unit 403. In addition, for a case where the multi function peripheral 1000 is not operated for a certain amount of time, it is considered that usage by the user has completed, and the multi function peripheral 1000 enters an authentication waiting state. Furthermore, it is similar for when the standby state is returned to after transitioning to the power saving state.

FIG. 12 illustrates a screen transition of the liquid-crystal display 401 for a case where the multi function peripheral 1000 that is displaying the authentication waiting screen 401c according to the present embodiment performs a facsimile reception.

When the multi function peripheral 1000 is in the authentication waiting state, the main control unit 600 receives a notification of the facsimile reception from the facsimile control unit 300. At that time, the main control unit 600 determines whether the sound volume setting value of the monitoring sound that is held in advance is set greater than or equal to the predetermined value, and if so set, causes the liquid-crystal display 401 to display the monitoring sound volume setting input screen 401a. In other words, according to the present embodiment, that the authentication waiting screen 401c is being displayed indicates that user authentication is not yet complete, and, even in this state, the screen for performing a sound volume setting for the monitoring sound is automatically displayed.

When the multi function peripheral 1000 is provided with an authentication function, conventionally there was a need to perform a sound volume setting after performing authentication work (card reading). However, by causing the monitoring sound volume setting input screen 401a to be immediately displayed even through authentication has not been performed, it becomes possible to swiftly suppress the sound volume. In contrast, cases where change of the monitoring sound volume is unnecessary may also be considered. In this case, similarly to the foregoing first through third embodiments, the permission input screen 401b for a screen transition may be displayed as illustrated by FIG. 13, instead of suddenly transitioning to the monitoring sound volume setting input screen 401a.

<Processing Procedure>

Figure 14:
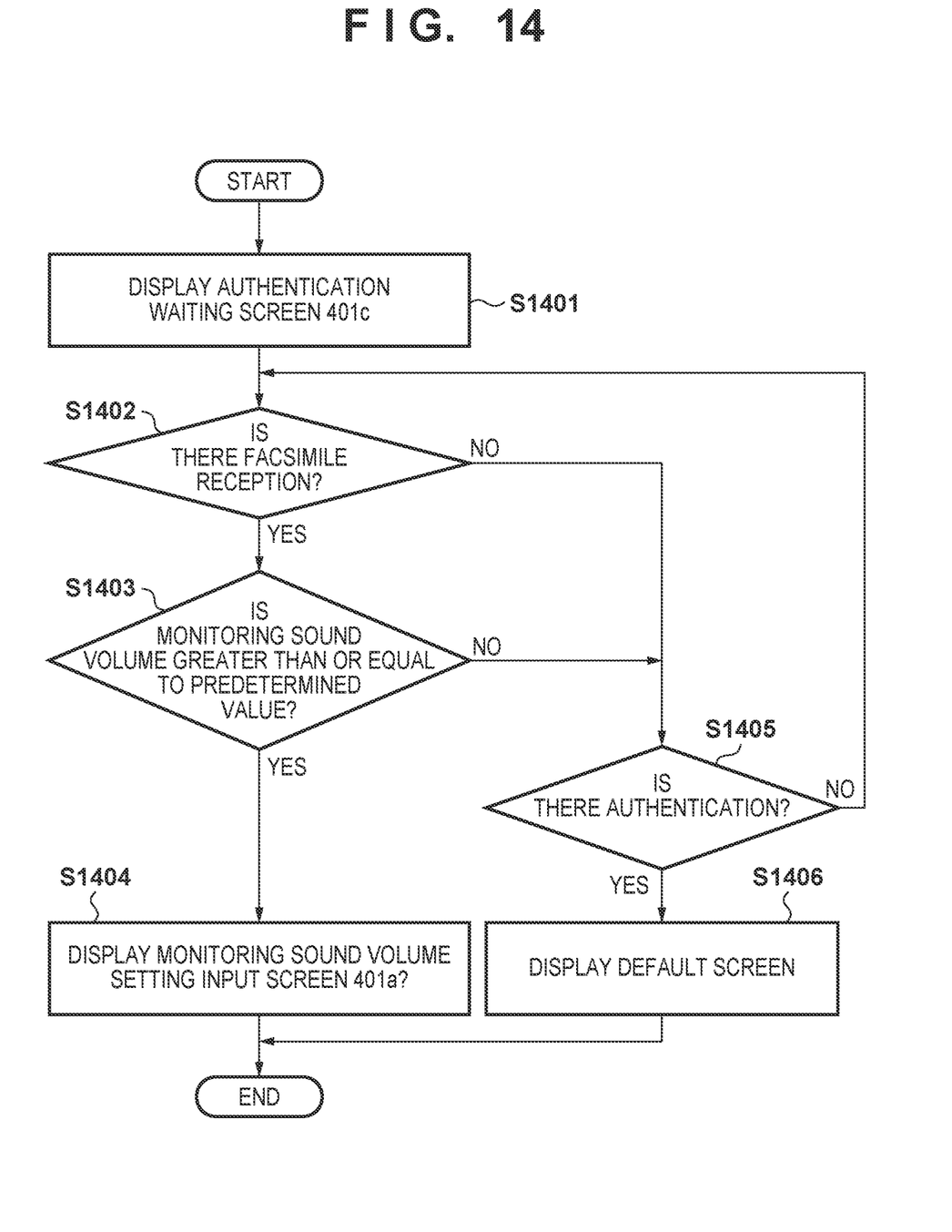
FIG. 14 is an operation flowchart of the main control unit 600 according to an embodiment.

Next, with reference to FIG. 14, description is given regarding a processing procedure of the main control unit 600 according to the present embodiment. Processing described below is realized by the CPU of the main control unit 600 reading a control program stored in advance in the ROM into the RAM, and then executing it, for example.

In step S1401, the multi function peripheral 1000 is in the authentication waiting state, and the main control unit 600 displays the authentication waiting screen 401c on the liquid-crystal display 401. Next, in step S1402, the main control unit 600 determines whether a facsimile reception has started in accordance with the facsimile control unit 300. If started the processing proceeds to step S1403, and otherwise the processing proceeds to step S1405.

In step S1403, if a facsimile reception has started in step S1402, the main control unit 600 confirms the sound volume setting value for the monitoring sound that is held in advance, and determines whether it is greater than or equal to the predetermined value. If it is greater than or equal to the predetermined value the processing proceeds to step S1404, and if not the processing proceeds to step S1405. In step S1404, the main control unit 600 causes the liquid-crystal display 401 to display the monitoring sound volume setting input screen 401a, and the processing ends. Here, the permission input screen 401b for a screen transition that is illustrated in FIG. 13 may be displayed, as described above.

In contrast, in step S1405, the main control unit 600 waits for card authentication from a user if there was no the facsimile reception in step S1402 or if the monitoring sound volume was less than the predetermined value in step S1403.

The main control unit 600 authenticates an ID read via the card reading unit 900, and if it matches an ID stored in advance, determines that the authentication is successful, and, in step S1406, displays the default screen that is to be caused to be displayed after authentication. In addition, if there was no card authentication in step S1405, the processing returns to step S1401, and the same flow from the start is repeated.

As describe above, the image forming apparatus according to the present embodiment is provided with a card reading unit for authenticating a user, and displays an authentication waiting screen if authentication of a user is not performed. If reception of facsimile data is started while the authentication waiting screen is being displayed, the image forming apparatus automatically displays a setting input screen on the display unit without needing authentication processing. Here, even if there is a facsimile reception in an authentication waiting state, it is possible to skip an authentication operation and automatically display a screen that enables adjustment of sound volume for monitoring sound. Accordingly, a user can immediately adjust the sound volume as necessary, and can make a setting for outputting monitoring sound in normal times with peace of mind.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-055103 filed on Mar. 22, 2018, which is hereby incorporated by reference herein in its entirety.

What is claimed is:

1. An image forming apparatus, comprising:
 a touch panel that displays information and receives a touch operation;
 a reception unit that receives facsimile data;
 an audio output unit that, in response to reception of the facsimile data by the reception unit, outputs a monitoring sound at a predetermined sound volume; and
 a control unit that, in response to the reception of the facsimile data by the reception unit, transitions a display content of the touch panel from a first screen to a second screen,
 wherein the second screen includes at least an adjustment key for adjustment of the sound volume but the first screen does not include the adjustment key for adjustment of the sound volume.

2. The image forming apparatus according to claim 1, wherein, in a case where the predetermined sound volume is greater than or equal to a predetermined value, the control unit displays the second screen on the touch panel.

3. The image forming apparatus according to claim 1, further comprising:
 a human detection sensor that detects a human who approaches the image forming apparatus,
 wherein the control unit,
 in a case where the human who approaches the image forming apparatus is detected by the human detection sensor when the image forming apparatus is in a power saving state, causes a return from the power saving state to a standby state, and at a time of the return, displays the second screen on the touch panel in a case where the facsimile data is being received by the reception unit, and displays a first screen on the touch panel in a case where the facsimile data is not being received by the reception unit.

4. The image forming apparatus according to claim 1, further comprising an input unit,
 wherein the control unit,
 upon accepting user input via the input unit when the image forming apparatus is in a power saving state, causes a return from the power saving state to a standby state, and
 at a time of the return, displays the second screen on the touch panel in a case where the facsimile data is being received by the reception unit, and displays a first screen on the touch panel in a case where the facsimile data is not being received by the reception unit.

5. The image forming apparatus according to claim 1, further comprising an authentication unit that authenticates a user,
 wherein the control unit,
 in a case where authentication is not being performed by the authentication unit, displays on the touch panel an authentication waiting screen for prompting a user for input for performing authentication, and
 in response to reception of the facsimile data by the reception unit while the authentication waiting screen is being displayed by the touch panel, displays the second screen on the touch panel without requiring authentication processing by the authentication unit.

6. The image forming apparatus according to claim 1, wherein the control unit, before displaying the second screen, displays on the touch panel a permission input screen for asking whether to display the second screen, and displays the second screen on the touch panel when user input via the permission input screen to permit display of the second screen is made.

7. The image forming apparatus according to claim 1, wherein the second screen includes a display that enables a setting for stopping monitoring sound to be made.

8. The image forming apparatus according to claim 1, wherein, when reception of the facsimile data by the reception unit completes, the control unit returns the sound volume of the monitoring sound adjusted via the second screen to the predetermined sound volume.

9. The image forming apparatus according to claim 1, wherein, when reception of the facsimile data by the reception unit completes, the control unit updates the predetermined sound volume to the sound volume of the monitoring sound adjusted via the second screen.

10. The image forming apparatus according to claim 1, wherein,
the second screen includes multiple adjustment keys, the multiple adjustment keys include a key for decreasing the sound volume and a key for increasing the sound volume, and a mute key is closer to the key for decreasing the sound volume than the key for increasing the sound volume.

11. The image forming apparatus according to claim 10, wherein,
the key for decreasing the sound volume is a first graphic icon, and
the key for increasing the sound volume is a second graphic icon.

12. The image forming apparatus according to claim 1, wherein,
the second screen includes information indicating a screen related to a FAX.

13. The image forming apparatus according to claim 1, wherein,
the second screen includes information indicating a screen related to a FAX communication sound volume.

14. The image forming apparatus according to claim 1, wherein,
the first screen is a login screen.

15. A method of controlling an image forming apparatus having a touch panel, the method comprising:
receiving facsimile data;
in response to reception of the facsimile data, outputting a monitoring sound at a predetermined sound volume; and
in response to the reception of the facsimile data, transitioning a display content of the touch panel from a first screen to a second screen,
wherein the second screen includes at least an adjustment key for adjustment of the sound volume but the first screen does not include the adjustment key for adjustment of the sound volume.

16. A non-transitory computer-readable storage medium storing a computer program for causing a computer to execute each step of a method of controlling an apparatus having a touch panel, the method comprising:
receiving facsimile data;
in response to reception of the facsimile data, outputting a monitoring sound at a predetermined sound volume; and
in response to the reception of the facsimile data, transitioning a display content of the touch panel from a first screen to a second screen,
wherein the second screen includes at least an adjustment key for adjustment of the sound volume but the first screen does not include the adjustment key for adjustment of the sound volume.

* * * * *